United States Patent
Krishnamurthy et al.

(10) Patent No.: US 8,914,805 B2
(45) Date of Patent: *Dec. 16, 2014

(54) RESCHEDULING WORKLOAD IN A HYBRID COMPUTING ENVIRONMENT

(75) Inventors: Rajaram B. Krishnamurthy, Wappingers Falls, NY (US); Natarajan Krishnaswami, New York, NY (US); Carl Joseph Parris, Rhinebeck, NY (US); Benjamin P. Segal, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/872,793

(22) Filed: Aug. 31, 2010

(65) Prior Publication Data

US 2012/0054771 A1 Mar. 1, 2012

(51) Int. Cl.
G06F 9/46 (2006.01)
G06F 9/50 (2006.01)
G06F 9/48 (2006.01)

(52) U.S. Cl.
CPC ............ *G06F 9/4881* (2013.01); *G06F 9/5088* (2013.01)
USPC ........................................................ 718/105

(58) Field of Classification Search
None
See application file for complete search history.

(56) References Cited

U.S. PATENT DOCUMENTS

| | | | |
|---|---|---|---|
| 5,031,089 A * | 7/1991 | Liu et al. ................. | 709/226 |
| 6,826,753 B1 | 11/2004 | Dageville et al. | |
| 7,167,916 B2 | 1/2007 | Willen et al. | |
| 7,565,651 B1 | 7/2009 | Carey | |
| 7,640,544 B2 | 12/2009 | Flood et al. | |
| 7,694,306 B2 | 4/2010 | Minor et al. | |
| 2003/0163659 A1 * | 8/2003 | Audrain ................. | 711/169 |
| 2003/0233391 A1 | 12/2003 | Crawford et al. | |

(Continued)

FOREIGN PATENT DOCUMENTS

WO 2008127623 10/2008

OTHER PUBLICATIONS

Binotto, A., et al., "Dynamic Self-Rescheduling of Tasks over a Heterogeneous Platform," Reconfigurable Computing and FPGAS, 2008, Reconfig 08, International Conference on, IEEE, Piscataway, N J, USA, Dec. 3, 2008.*

(Continued)

*Primary Examiner* — Emerson Puente
*Assistant Examiner* — Sisley Kim
(74) *Attorney, Agent, or Firm* — Fleit Gibbons Gutman Bongini & Bianco PL; Thomas Grzesik

(57) ABSTRACT

Embodiments of the present invention manage workloads in a high-throughput computing environment for a hybrid processing system. A set of high-throughput computing service level agreements (SLAs) is retrieved. The set of SLAs is associated with a hybrid processing system including a server system and a set of accelerator systems, where each system has a different architecture. A first set of data-parallel workload tasks scheduled on the server system and a second set of data-parallel workload tasks scheduled with the set of accelerator systems are identified. At least a portion of one of the first set of data-parallel workload tasks and the second set of data-parallel workload tasks is dynamically rescheduled on a second one of the server system and the set of accelerator systems. The dynamically rescheduling substantially satisfies the set of high-throughput computing SLAs.

25 Claims, 13 Drawing Sheets

(56) References Cited

U.S. PATENT DOCUMENTS

| | | | |
|---|---|---|---|
| 2004/0139088 A1* | 7/2004 | Mandato et al. | 707/100 |
| 2006/0184349 A1 | 8/2006 | Goud et al. | |
| 2006/0225078 A1 | 10/2006 | Anderson | |
| 2008/0276262 A1* | 11/2008 | Munshi et al. | 719/328 |
| 2009/0064168 A1 | 3/2009 | Arimilli et al. | |
| 2009/0300224 A1 | 12/2009 | Duffy et al. | |
| 2010/0114531 A1* | 5/2010 | Korn et al. | 702/186 |

OTHER PUBLICATIONS

Vrba, Z., et al., "A Simple Improvement of the Work-Stealing Scheduling Algorithm," Simula Research Laboratory, Department of Informatics, University of Oslo, Norway, 1-6.

International Search Report and Written Opinion dated Jun. 6, 2011 for PCT/EP2010/067050.

Binetto, A., et al., "Dynamic Self-Rescheduling of Tasks over a Heterogeneous Platform," Reconfigurable Computing and FPGAS, 2008, Reconfig 08, International Conference on, IEEE, Piscataway, NJ, USA, Dec. 3, 2008, pp. 253-258, XP031382682, ISBN: 978-1-4244-3748-1.

Augonnet, C., et al., "StarPU: A Unified Platform for Task Scheduling on Heterogeneous Multicore Architectures," Aug. 25, 2009, EURO-PAR 2009 Parallel Processing, Springer Berlin, Heidelberg, Berlin, pp. 863-874, XP019127294, ISBN: 978-3-642-03868-6.

Pathak, J., et al., "A Framework for Dynamic Resource Management on the Grid," Internet Citaiton, Aug. 22, 2005, XP002434578, URL:http://www.hpl.hp.co.uk/techreports/20, 05/HPL-20050153.pdf, retried on May 21, 2007.

Non-Final Rejection received for U.S. Appl. No. 12/872,761 dated Mar. 21, 2012.

Final Rejection received for U.S. Appl. No. 12/872,761 dated Jun. 8, 2012.

International Search Report and Written Opinion dated Jun. 8, 2011 for PCT/EP2010/067051.

Ejarque, J., et al., "SLA-Driven Semantically-Enhanced Dynamic Resource Allocator for Virtualized Service Providers," Escience, 2008, IEEE Fourth International Conference on, IEEE, Piscataway, NJ, USA, Dec. 7, 2008, pp. 8-15, XP031399598, ISBN: 978-1-4244-3380-3.

* cited by examiner

RESCHEDULING WORKLOAD IN A HYBRID COMPUTING ENVIRONMENT

CROSS-REFERENCE TO RELATED APPLICATIONS

The present patent application is related to co-pending and commonly owned U.S. patent application Ser. No. 12/872,761, entitled "HIGH-THROUGHPUT COMPUTING IN A HYBRID COMPUTING ENVIRONMENT", filed on even date with the present patent application, their entire teachings of which being hereby incorporated by reference.

FIELD OF THE INVENTION

The present invention generally relates to hybrid computing environments, and more particularly relates to a performing high-throughput computing in a hybrid computing environment.

BACKGROUND OF THE INVENTION

Computer systems today have advanced such that some computing environments now include core components of different architectures which operate together to complete data processing tasks. Such computing environments are generally referred to as "hybrid" environments, denoting that such environments include host computers and accelerators having different architectures. Although hybrid computing environments are more computationally powerful and efficient in data processing than many non-hybrid computing environments, such hybrid computing environments generally do not provide high-throughput computing capabilities.

SUMMARY OF THE INVENTION

In one embodiment, a method for managing workloads in a high-throughput computing environment for a hybrid processing system is disclosed. The method comprises retrieving a set of high-throughput computing service level agreements (SLAs). The set of high-throughput computing SLAs are associated with a hybrid processing system. The hybrid processing system comprises at least one server system comprising a first architecture and a set of accelerator systems each comprising a second architecture that is different from the first architecture. A first set of data-parallel workload tasks scheduled on the server system and a second set of data-parallel workload tasks scheduled with the set of accelerator systems are identified. A set of resources at a first one of the server system and the set of accelerator systems is determined to be currently available. At least a portion of one of the first set of data-parallel workload tasks and the second set of data-parallel workload tasks is dynamically rescheduled on a second one of the server system and the set of accelerator systems. The dynamically rescheduling substantially satisfies the set of high-throughput computing SLAs.

In another embodiment, a system for managing workloads in a high-throughput computing environment for a hybrid processing system is disclosed. The system comprises a memory and a processor that is communicatively coupled to the memory. A workload manager is communicatively coupled to the memory and the processor. The workload manager is adapted to perform a method. The method comprises retrieving a set of high-throughput computing service level agreements (SLAs). The set of high-throughput computing SLAs are associated with a hybrid processing system. The hybrid processing system comprises at least one server system comprising a first architecture and a set of accelerator systems each comprising a second architecture that is different from the first architecture. A first set of data-parallel workload tasks scheduled on the server system and a second set of data-parallel workload tasks scheduled with the set of accelerator systems are identified. A set of resources at a first one of the server system and the set of accelerator systems is determined to be currently available. At least a portion of one of the first set of data-parallel workload tasks and the second set of data-parallel workload tasks is dynamically rescheduled on a second one of the server system and the set of accelerator systems. The dynamically rescheduling substantially satisfies the set of high-throughput computing SLAs.

In yet another embodiment, a computer program product for managing workloads in a high-throughput computing environment for a hybrid processing system is disclosed. The computer program product comprises a storage medium readable by a processing circuit and storing instructions for execution by the processing circuit for performing a method. The method comprises retrieving a set of high-throughput computing service level agreements (SLAs). The set of high-throughput computing SLAs are associated with a hybrid processing system. The hybrid processing system comprises at least one server system comprising a first architecture and a set of accelerator systems each comprising a second architecture that is different from the first architecture. A first set of data-parallel workload tasks scheduled on the server system and a second set of data-parallel workload tasks scheduled with the set of accelerator systems are identified. A set of resources at a first one of the server system and the set of accelerator systems is determined to be currently available. At least a portion of one of the first set of data-parallel workload tasks and the second set of data-parallel workload tasks is dynamically rescheduled on a second one of the server system and the set of accelerator systems. The dynamically rescheduling substantially satisfies the set of high-throughput computing SLAs.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Operating Environment

Figure 1:
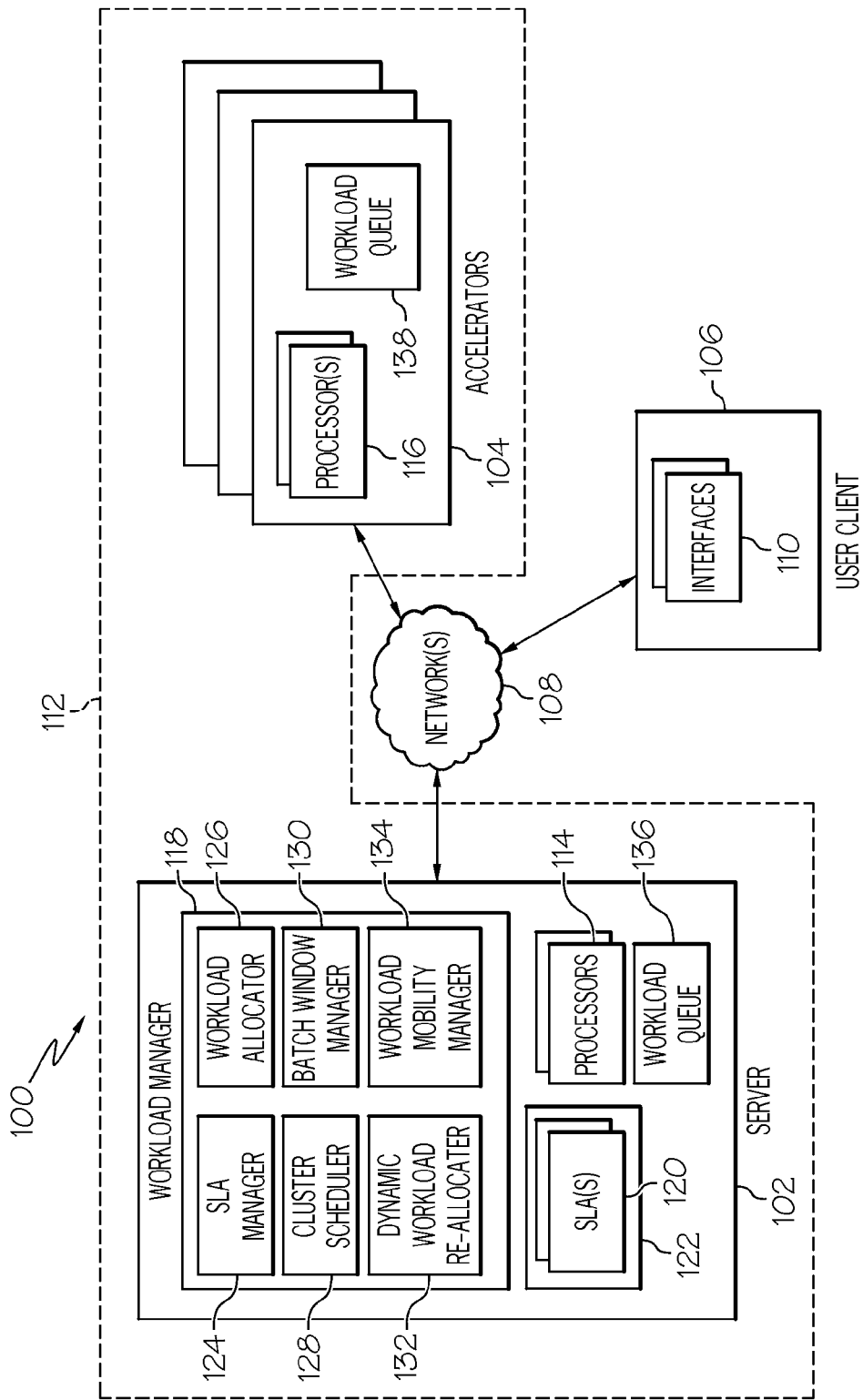
FIG. 1 is a block diagram illustrating one example of an operating environment according to one embodiment of the present invention.

FIG. 1 shows one example of an operating environment 100 applicable to various embodiments of the present invention. The operating environment 100, in this example, is a hybrid computing environment. A "hybrid computing environment", as the term is used herein, is a computing environment in that it includes computer processors operatively coupled to computer memory so as to implement data processing in the form of execution of computer program instructions stored in the memory and executed on the processors.

In addition, the hybrid computing environment 100 in the example of FIG. 1 comprises a host/server architecture that operates in cooperation with an accelerator having an accelerator architecture where the server architecture and accelerator architecture are different architectures. The host/server and accelerator architectures in this example are characterized by architectural registers, registers that are accessible by computer program instructions that execute on each architecture, registers such as, for example, an instruction register, a program counter, memory index registers, stack pointers, and the like. That is, the number, type, structure, and relations among the architectural registers of the two architectures are different, so different that computer program instructions compiled for execution on the host computer of a hybrid computing environment typically cannot be executed natively by any associated accelerator of the hybrid computing environment. Examples of hybrid computing environments include a data processing system that in turn includes one or more host computers, each having an IBM® System z® processor, and accelerators whose architectural registers implement the IBM® POWER® instruction set. Computer program instructions compiled for execution on the System z processors in the host computers cannot be executed natively by the POWER processors in the accelerators.

In particular, FIG. 1 shows a host system such as a server system 102, a plurality of accelerator systems 104, and one or more user clients 106 communicatively coupled via one or more networks 108. The one or more networks 108 can be any type of wired and/or wireless communications network. For example, the network 108 may be an intranet, extranet, or an internetwork, such as the Internet, or a combination thereof. The network(s) 108 can include wireless, wired, and/or fiber optic links. In one embodiment, the server system 102 is any type of server system such as, but not limited to, an IBM System z server. The accelerator systems 104, in one embodiment, are blade servers such as, but not limited to, IBM System p® or System x® servers. The user client 106, in one embodiment, is any information processing system such as, but not limited to, a workstation, desktop, notebook, wireless communication device, gaming console, and the like that allows a user to interact with the server system 102 and/or the accelerator systems 104. The user client 106 comprises one or more interfaces 110 that allow a user to interact with the server system 102 and/or the accelerator systems 104. It should be noted that the examples of the server system 102, accelerator systems 104, and user client 106 given above are for illustrative purposes only and other types of systems are applicable as well.

The combination of the server system 102 and the accelerator systems 104 is herein referred to as a hybrid server/system 112 within the hybrid environment 100 because of the heterogeneous combination of various system types of the server 102 and accelerators 104. For example, the server system 102 comprises one or more processors 114 (each with one or more cores) operatively coupled to computer memory, Random Access Memory (not shown), through a high-speed memory bus (not shown). The processor(s) 114 comprises a set of architectural registers (not shown) that defines the host computer architecture. Each accelerator 104 also comprises one or more processors 116 that comprise a set of architectural registers (not shown) that defines the accelerator architecture. It should be noted that each of the accelerator systems 104 can comprise the same or different type of processor.

The architectural registers of the processors 116 (each with one or more cores) of each accelerator are different from the architectural registers of the processors 114 in the server system 102. With differing architectures, it would be uncommon, although possible, for a server system 102 and an accelerator 104 to support the same instruction sets. As such, computer program instructions compiled for execution on the processors 116 of an accelerator 104 generally would not be expected to execute natively on the processors 114 of the server system 102 and vice versa. Moreover, because of the typical differences in hardware architectures between server and accelerator processors, computer program instructions compiled for execution on the processors 114 of a server system 102 generally would not be expected to execute natively on the processors 116 of an accelerator 104 even if the accelerator supported the instruction set of the server. The accelerator architecture is optimized, with respect to the server system 104 for speed of execution of a particular class of computing functions. That is, for the function or functions for which the accelerator is optimized, execution of those functions will generally proceed faster on the accelerator 104 than if they were executed on the processors of the server system 102.

In one embodiment, the server system 102 comprises, among other things, a workload manager 118, one or more processors 114, and a plurality of Service Level Agreements (SLAs) 120 stored within a database or memory 122. It should be noted that the SLAs can also be stored on one or more information processing systems (not shown) that are communicatively coupled to the server system 102. An SLA, in one embodiment, is a stipulation by a user of service levels that need to be met by a workload. A workload manager negotiates levels and orchestrates workloads to meet those service levels. A Throughput computing SLA record can have multiple sub-records for performance-throughput, performance-response time-batch window, Energy, Reliability and Availability. SLA record values can change dynamically during a workload run because of change in input data rates and volumes or other execution conditions The workload manager 118 is configured to provide a high-throughput computing (HTC) environment for the hybrid server 112. This high-throughput computing environment can comprise (i) data-parallel and vector elements; (ii) batch windows; and (iii) sustained compute throughput (operations/second) over a long period of time. In one embodiment, the hybrid server 112 utilizes single instruction, multiple data (SIMD) structures, which increase the work a single instruction performs so that it operates on multiple data items simultaneously, to achieve data parallelism.

The processors within the hybrid server 112 that comprise SIMD are able to perform data-parallel computations of a certain length natively in their SIMD units. For workloads requiring data-parallel computations with long vectors, SIMD units from multiple processor cores can be "ganged" or "daisy-chained" in software allowing operations on vectors longer than allowed by the native SIMD units of a processor core. The choice of using this ganged configuration is made if "headroom" on the server processor is available across multiple cores. Alternatively, the workload can complete the data-parallel computation in a loop on single core.

The workload manager 118 comprises an SLA manager 124, a workload allocator 126, a cluster scheduler 128, a batch window manager 130, a dynamic workload reallocator 132, a workload mobility manager 134, and workload queue 136. The workload manager 118 and each of these components are discussed in greater detail below. The accelerator(s) 104 comprises, among other things, one or more processors 116, as discussed above, and one or more workload queues 138 for queuing various workloads to be performed at the accelerator 104, the accelerator is discussed in greater detail below.

As discussed above, the hybrid system 112 is a heterogeneous system. Therefore, in one embodiment, the hybrid computing environment 100 implements a cross-platform parallel programming environment such as, but not limited to, an OpenCL (Open Compute Language) environment. This type of environment allows for parallel programming across a number of heterogeneous devices such as CPUs, GPUs, and accelerators. In other words, a cross-platform parallel programming environment allows programs to execute across heterogeneous components. In this environment a workload comprises multiple processes/address spaces. Each process may execute several tasks and each task can offload certain compute intensive portions to a compute kernel, which are basic units of executable code. The compute kernel may execute on one compute element or several compute elements such as a processor core. A compute kernel can be either task-parallel with respect to CPUs such as the processors found within the server system 102 or data-parallel with respect to CPUs such as the processors found within the accelerators 104. The hybrid system 112 maintains separate compute kernels for each of the different architectures within the hybrid system 112, if the compute kernels are written in a language like C or C++ and compiled to the native instruction set. If the compute kernels are written in a language like Java or OpenCL, only one kernel need be maintained as Java and OpenCL provide support for compute kernels to run portably across different architectures. Workloads are queued in the workload queues 136, 138 of the server 102 and accelerators 104, respectively.

The workload manager 118 sends these compute kernels to the accelerators 104. Alternatively, an OpenCL runtime process on the server can send these kernels to the accelerators when a process calling these kernel functions is launched. The accelerators can also choose to store OpenCL kernels in their local tertiary storage. These kernels can be invoked when a calling process on the server is run. These compute kernels are then launched on the accelerators 104. The server passes data to these compute kernels and computes a result based on the data. These results are then passed from the accelerators 104 to the server system 102. It should be noted that even though the following discussion may discuss various embodiments with respect to this cross-platform parallel programming environment, one or more embodiments of the present invention are also applicable to non-cross-platform parallel programming environments as well.

As discussed above, conventional hybrid computing environments generally do not provide for unified specification and management of high-throughput computing requirements across the entire hybrid computing system. For example, many server systems implemented within a hybrid computing environment are not configured for performing data-parallel operations over a long span of time. Also, conventional hybrid computing environments usually schedule less compute intensive workloads such as online transaction processing workloads on a server system and more compute intensive workloads on an accelerator(s). However, as will be discussed in greater detail below, various embodiments of the present invention overcome these problems by supporting throughput computing SLAs, surrogate execution between the server 102 and the accelerators 104, cross-linked queues across network links, and combined data/workload stealing based on performance/energy tradeoffs. Also, various embodiments maximize throughput and minimize the energy footprint (when a server system's MIPS/Watt or Flops/Watt is less than a comparable accelerator system) by placing compute intensive workload components on the server system along with an accelerator(s).

High-Throughput Computing in a Hybrid Computing Environment

The workload manager 118, in one embodiment, provides a throughput computing environment for the hybrid system 112 by supporting SLAs 120 and workload management. The workload manager 118 provides SLA support for data-parallel operations, e.g., vector operations/second; elastic batch windows; support for both server system and accelerator processors; workload cluster scheduling; and resource guarantees with respect to input/output, memory, and processor components. The workload manager 118, via the workload allocator 126, is able to manage/allocate workloads across both the server system and accelerator resources in order to satisfy the requirements of the SLAs 120.

Figure 2:
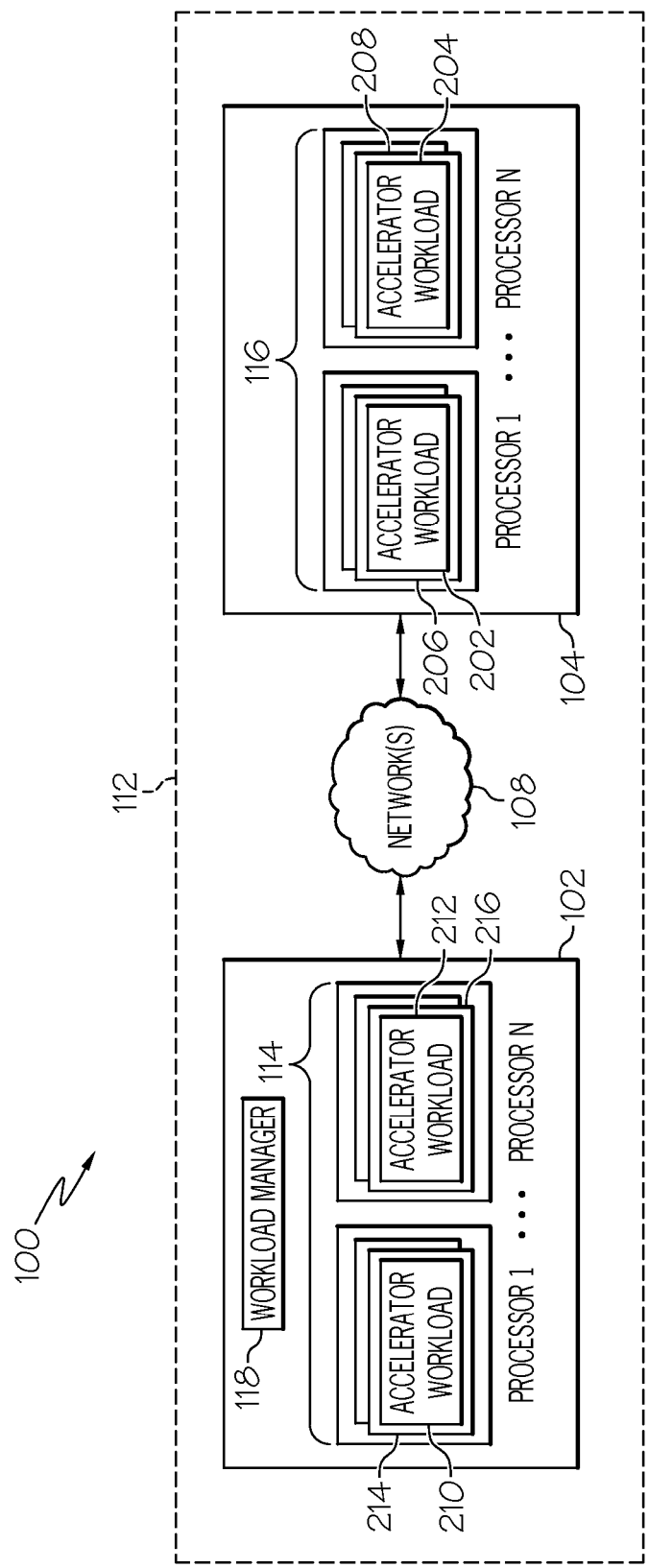
FIG. 2 is a block diagram showing one example of distributing high-throughput computing workloads across a hybrid system according to one embodiment of the present invention.

For example, the SLA manager 124 retrieves an SLA 120 from a storage area 122 and determines that the SLA 120 requires 10,000 operations per second over a two day period of time. In this example, the kernels at the accelerators 104, as an aggregate, may only be able to perform 5,000 operations per second, which would not satisfy the SLA 120. Therefore, the workload manager 118 schedules a portion 202, 204 of the accelerator workload (e.g., tasks) as one or more compute kernels 206, 208 at the accelerator processors 116 and a remaining portion 210, 212 of the workload as one or more compute kernels 214, 216 at the server system processors 114 so that the SLA 120 of 10,000 operations per second can be achieved. The processors 114 at the server system 102 can be referred to as "surrogate processors" since they are processors performing data-parallel computing of accelerator workloads to supplement the accelerator processor 116. The usage of the server system resources to supplement the accelerator resources can be referred to as "surrogate execution". As can be seen from FIG. 2, the workload manager 118 is able to utilize resources on the server system 104 to supplement the accelerator resources for achieving the SLA requirements.

The workload manager 118 also provides resource guarantees. For example, if an SLA 120 requires 10,000 operations per second the workload manager 118 ensures that hybrid system 112 is providing that sustained rate. However, this SLA 120 may change from 10,000 operations per second to 15,000 operations per second because of additional incoming data (for example). Therefore, the workload manager 118, in this example, dynamically allocates additional kernels 206, 208, 214, 216 to the server system 102, accelerators 104, or both so that additional accelerator workloads can be executed in order to sustain 15,000 operations per second. In other words, the workload manager 118 provides resource guarantees so that if there is a change in throughput computing rates then the workload manager 118 allocates additional resources to provide the throughput computing rate. Additionally, the workload manager can run an agent on the accelerators that measure using hardware and software counters, the effective compute throughput rate, input/output data rate and memory bandwidth.

As discussed above, the hybrid system 112 performs data-parallel operations. In other words, data can be distributed across multiple processors or computing nodes within the hybrid system 112. In some instances, these data-parallel operations may require data from other operations. For example, a first workload group might be performing a multiplication of vectors and a second group may be performing a subtraction of vectors and require the result of the first group. Therefore, the workload manager 118, via the workload cluster scheduler 128, identifies dependent workload groups and places these dependent groups together in a cluster so that they can be scheduled on a set of server system processors 114 and accelerator processors 116 simultaneously. In other words, a plurality of workload groups are within a single cluster and are a set of like data-parallel workloads (e.g., they perform similar data-parallel operations) with dependencies between workloads and workload groups. For example, the workloads 202, 204, 210, 212 shown in FIG. 2 can all be within a workload cluster. Therefore, a result of a first workload group from a first cycle can be passed to a second workload group in the same cluster prior to the second cycle starting. It should be noted that the workloads within a cluster can be mixed and are not required to be similar, but they are still scheduled at once or at the same time. The workload manager 118, via the cluster scheduler 128, can then temporally align workloads within a cluster if they have dependencies, as well as, temporally align workload clusters if they have dependencies between each other.

In addition, the workload manager 134, via the batch window manager 130, supports elastic batch windows. A batch window is a time window that specifies when a batch processing workload may complete. This is an attribute of an SLA (Service Level Agreement). A batch window specification is used by the workload manager to allocate resources so that the workload can complete within the batch window. During the course of workload execution, a workload may be required to complete before or after the initial batch deadline specification. Such a batch window specification is termed an elastic batch window. A batch window may shrink or expand over time based on the business process requirements or data processing requirements during execution. The workload manager 134, via the batch window manager 130, assigns more resources, for example, to a workload cluster to meet a shrinking batch window. This process can include adding or deleting additional accelerators on the fly and/or adding/deleting server system surrogate processors on the fly. Each additional accelerator can run compute kernels that allow the contracted batch time window to be met. If the batch window specification is relaxed, then the workload manager 134 can remove accelerators and associated kernels so that these may be reused by other workloads. The workload can complete within the relaxed batch window using the optimized set of accelerator resources.

Figure 3:
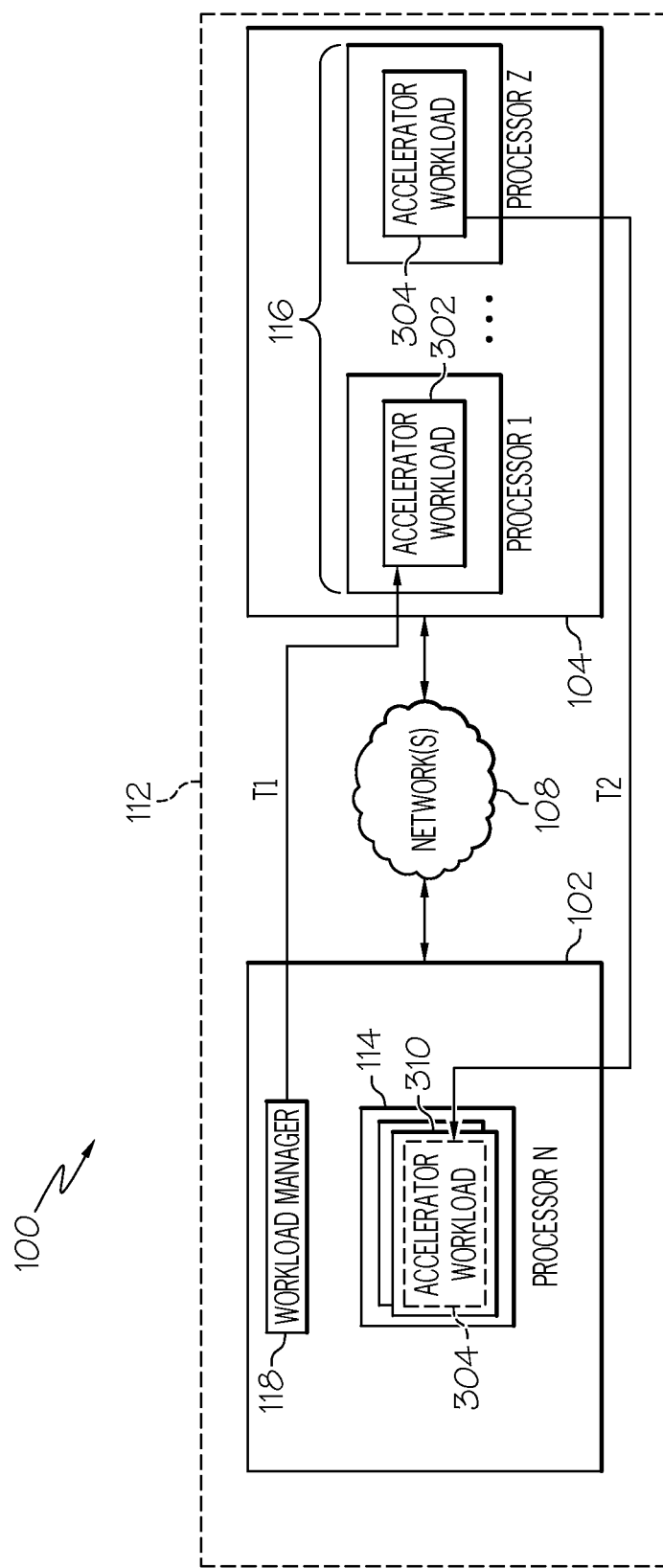
FIG. 3 is a functional timing diagram illustrating workload migration in a hybrid system according to one embodiment of the present invention.

Once the workload(s) has been scheduled across the hybrid system 112, the workload manager 118, via the workload mobility manager 134, allows for heterogeneous mobility between the server system 102 and the accelerators 104. In other words, workloads can move from an accelerator processor 116 (implemented with a first architecture) to a surrogate processor 114 on the server system 102 (implemented with a second architecture that is different from the first architecture). For example, FIG. 3 shows that, at T1, a plurality of workloads 302, 304 are allocated at the accelerator processors 116. The workload manager 118 determines that one or more workloads 304 need to be migrated over to the server system 102. For example, the workload 304 may need specific data from the server system 102, but an SLA 120 indicates that this data cannot be moved off of the server system 102 for security reasons. Therefore, the workload manager 118, at T2, migrates the workload 304 from the accelerator 104 to a compute core (or accelerator) 310 at the server system 102 where the workload 304 can perform its operations with the required data at the server system 102.

Heterogeneous mobility can be performed in various ways. For example, a first method is to perform an architecture independent checkpoint state when a mobility interrupt is received. If the code of the workload that is migrating comprises control flow then all of the variables in the code are saved with any source code line numbers corresponding to interrupted state. These are then reloaded on the new processor when the workload migrates. If the code comprises dataflow, data from the workload can be passed from server/accelerator where the workload is migrating from to the server/accelerator where the workload is migrating to. In this first method two copies of executables reside on each of the different architectures.

In a second method the executable can be stopped at the migrating from processor and restarted on the migrated to processor. For example, the recovery unit (not shown) of the migrated from processor (either at the server system 102 or the accelerator 104) is used to save the execution state of this migrated from processor. A recovery unit or R-unit in System z and System p processors stores the entire architectural state of the processor. A mapping table associates register state with Intermediate Representation (IR) structures and symbols and source code level structures and symbols. When the workload is migrated to the other processor the execution state of the recovery unit can be decoded and loaded on the new processor using the mapping table. These embodiments allow workloads to be migrated across physical machines of different architectures. The workload manager 118 moves workloads to locations where data exchange is most efficient, secure, and/or where the data is available.

Decisions to migrate a workload from an accelerator 104 to the server system 102 or vice versa can be based on performance or energy requirements as indicated by an SLA 120 or on natural interaction affinity (data exchange efficiency and security). Also, migration can depend on the type of workload being executed. For example, one type of workload is a throughput computing batch workload (e.g., fix/expand tasks, variable assignment of input data with a focus on data-parallel operations) and another type of workload is a long running computation workload (with mostly scalar operations).

With respect to throughput computing batch workloads, these workloads can be allocated to server system processors 114, accelerator processors 116, or both. The mobility manager 134 monitors performance metrics and/or energy metrics with respect to the workload to determine if these metrics are above or below a respective given threshold. If the workload mobility manager 134 determines that the given threshold is not being met or, alternatively, is being exceeded then the mobility manager 134 migrates at least a portion of the workload from its current system (server 102 or accelerator 104) to the other system (server 102 or accelerator 104). This allows the hybrid system 112 to achieve a performance and/or energy metric level as set forth by the corresponding SLA 120. It should be noted that throughput computing batch workloads can be initialized with a batch time window and energy window specification. A batch time window specification can stipulate that a throughput computing workload must complete within e.g. four hours. An energy window specification can stipulate that a workload must not consume more than 400 Watt-hours of energy. The workload manager 134 takes into account both batch time window and energy window specifications to execute a workload. A workload might be run on an accelerator leading to a contracted execution time of e.g. 2 hours, but an energy consumption of 300 Watt-hours. The workload manager 134 can decide to move the workload to the server (assuming the server is energy efficient), if it can assess that the batch window can be met with reasonable satisfaction of the energy window. An SLA may also include fields for prioritization between batch windows and energy windows. Also, for such workloads, mobility is completed only after task completion and state is not maintained.

With respect to workloads with long running computations, these workloads can comprise initial startup data and workload mobility is not performed unless execution conditions, e.g., cross-over points, are met. These workloads can be initialized with a batch time window or energy window specification such that when these windows are reached only then are these workloads migrated. However, prior to migrating the workload it may need to checkpoint. This workload type may support only limited checkpoint locations where mobility may be pursued.

As discussed above, in conventional hybrid computing environments compute intensive workloads are generally scheduled only on accelerators and are not scheduled on the server systems. However, the hybrid system 112 of various embodiments of the present invention take advantage of the fact that the server system processors 114 in many instances have the capacity to supplement the accelerator processors 116. For example, a server system processor 114 may comprises additional resources or computing operations in the form of allotted "dormant" MIPS (million instructions per second), which are pre-purchased MIPS that are not currently being used; unused floating point operation capacity; or unused processor capacity when a processor is "blocked" for a certain IO to complete. Therefore, the workload manager 118 can utilize this server system "headroom" to execute the data-parallel accelerator workloads in a surrogate manner. In other words, the workload manager 118, via the dynamic workload reallocator 132, reallocates previously scheduled workloads on the accelerator 104 to the server system 102. The server system processors 114 act as surrogate processors to execute these reallocated workloads in parallel with the workloads remaining on the accelerator processors 116. In other words, unused capacity of server processors can be used to execute accelerator kernels or workloads.

Additionally, the server system 102 and accelerators 104 can "steal" workloads from each other. For example, each of the workload queues 136, 138 of the server system 102 and accelerators 104 are cross-linked. In other words, the server system 102 can access the workload queue 138 of the accelerator 104 and the accelerator 104 can access the workload queue 136 of the server system 102. The server system 102 and accelerators 104 take workloads allocated to the other system because these queues 136, 138 reside in a memory region that is shared between the server system 104 and the accelerator 104. This memory region resides on the server system 102 and the accelerators 104 for each workload queue.

Figure 4:
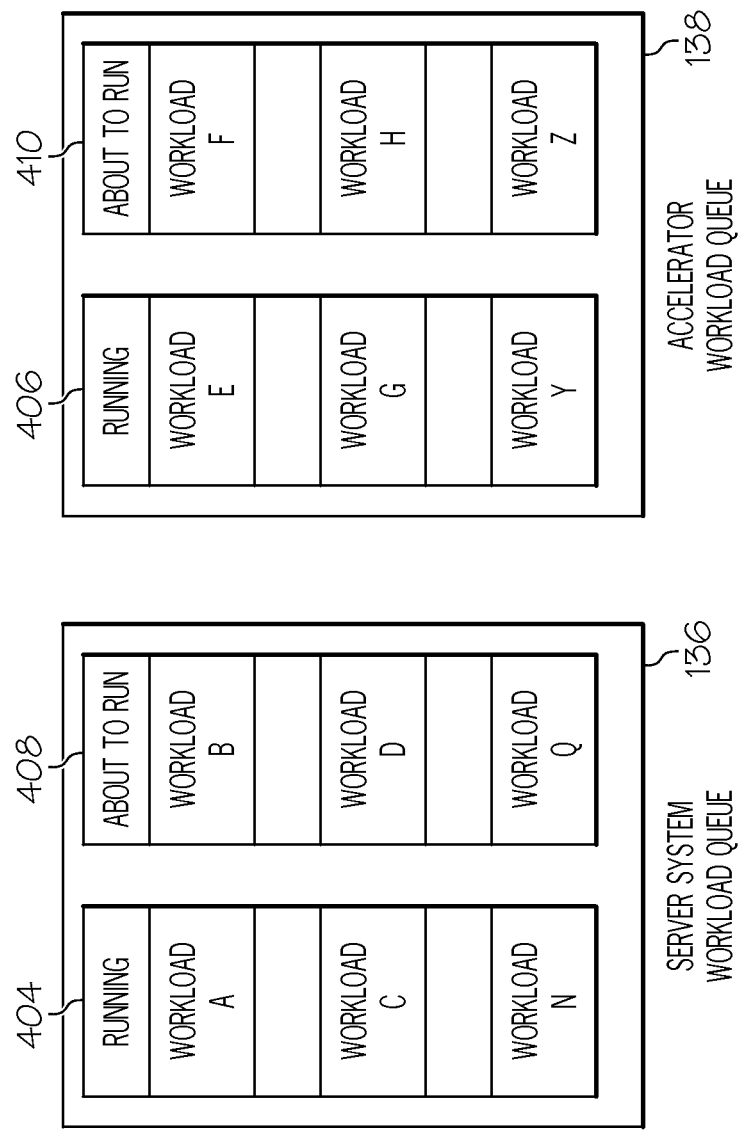
FIG. 4 is a block diagram illustrating one example of a workload queue for a hybrid system according to one embodiment of the present invention.

As shown in FIG. 4, these queues 136, 138 can comprise a "running" queue 404, 406 and an "about to run" queue 408, 410. The "running" queue indicates which workloads are currently running at the respective system 102, 104. The "about to run" queue 408, 410 indicates which workloads are not currently running but are in the queue waiting to be executed. When a processor 114 on the server system 112 has finished its allotted workload and determines that the accelerator workload queue 138 has workloads waiting to be executed, the server system 114, via the dynamic workload reallocator 132, can then take work from the accelerator workload queue 138 and execute this workload on the server system 102. The accelerator 104 can also perform a similar operation where the workload manager 118 takes workloads from the server system workload queue 136 and dynamically reallocates it to the accelerator 104. Additionally, if the workload in the server system workload queue 136 is an accelerator workload and these workloads are not being performed efficiently then the accelerator 104 can take back these workloads. The system 102, 104 from which the tasks were taken from can reclaim these tasks once their performance/energy metrics are above a given threshold.

In another embodiment, the workload manager 118, via the dynamic workload reallocator 132, can redistribute workloads based on deadlines/performance and energy requirements. For example, an SLA 120 can comprise task deadline requirements, performance requirements, and energy requirements. The dynamic workload reallocator 132 can monitor current workloads at the server system 102 and the accelerator 104 and determine if these requirements will be met. If the dynamic workload reallocator 132 determines that one or more of these requirements will not be met for a given workload, the dynamic workload reallocator 132 dynamically migrates the given workload over to the other system (i.e., either the server system 102 of the accelerator 104) so that the SLA requirements can be achieved. In other words, workloads are dynamically redistributed to meet the SLAs of the workload. Any changes in the SLAs trigger dynamic distribution of the workload across the hybrid system 112.

The workload manager 118 can also combine aspects of workload "stealing" and redistribution discussed above. For example, because the workloads are data-parallel, the server system 102 or accelerator 104 is able to "steal" only a portion of the workload or data associated with the workload. Kernels executing similar functions can run on the host or the accelerator. The server or accelerator can "steal" input data (also known as problem input data) instead of the entire kernel from the server or the accelerator's about-to-run queue. This is possible as the server or accelerator "stealing" the input problem data is running a copy of the same function. A server or accelerator can also steal data portions from kernels currently being run. For this to be possible, the kernel sets assist_flag fields (in the running queue entry) to <yes> and provides locations of data as a collection of (start address, end address) tuples. The kernel stealing the data portion can provide its identifier and location so it can participate in any synchronization activity that the "stolen from" kernel might require. This is advantageous since the system may not be able to handle the entire workload. However, the server system 102 or the accelerator 104 still needs to adhere to the requirements of the SLAs 120. For example, consider an SLA that requires the server system 102 and/or the accelerator 104 to meet a certain energy requirement. The server system 102 and the accelerator 104 may have headroom to "steal" a workload or a portion of a workload, but if the server system 102 or the accelerator 104 is not able to meet the energy requirement of the SLA the workload manager 118 prevents the server system 102 and the accelerator 104 from taking the workload. Therefore, "stealing" thresholds based on performance and/or energy metrics can be used to either allow or disallow workload stealing. As can be seen, "stealing" can be used to meet deadlines and energy goals indicated by an SLA 120. Workloads or portions of workloads and/or corresponding data are stolen to maintain throughput computing SLAs. If the cost of stealing a task of a workload across the network 108 will decrease the performance attribute of the throughput computing SLA then the workload manager 118 can prevent this task from being stolen.

Figure 5:
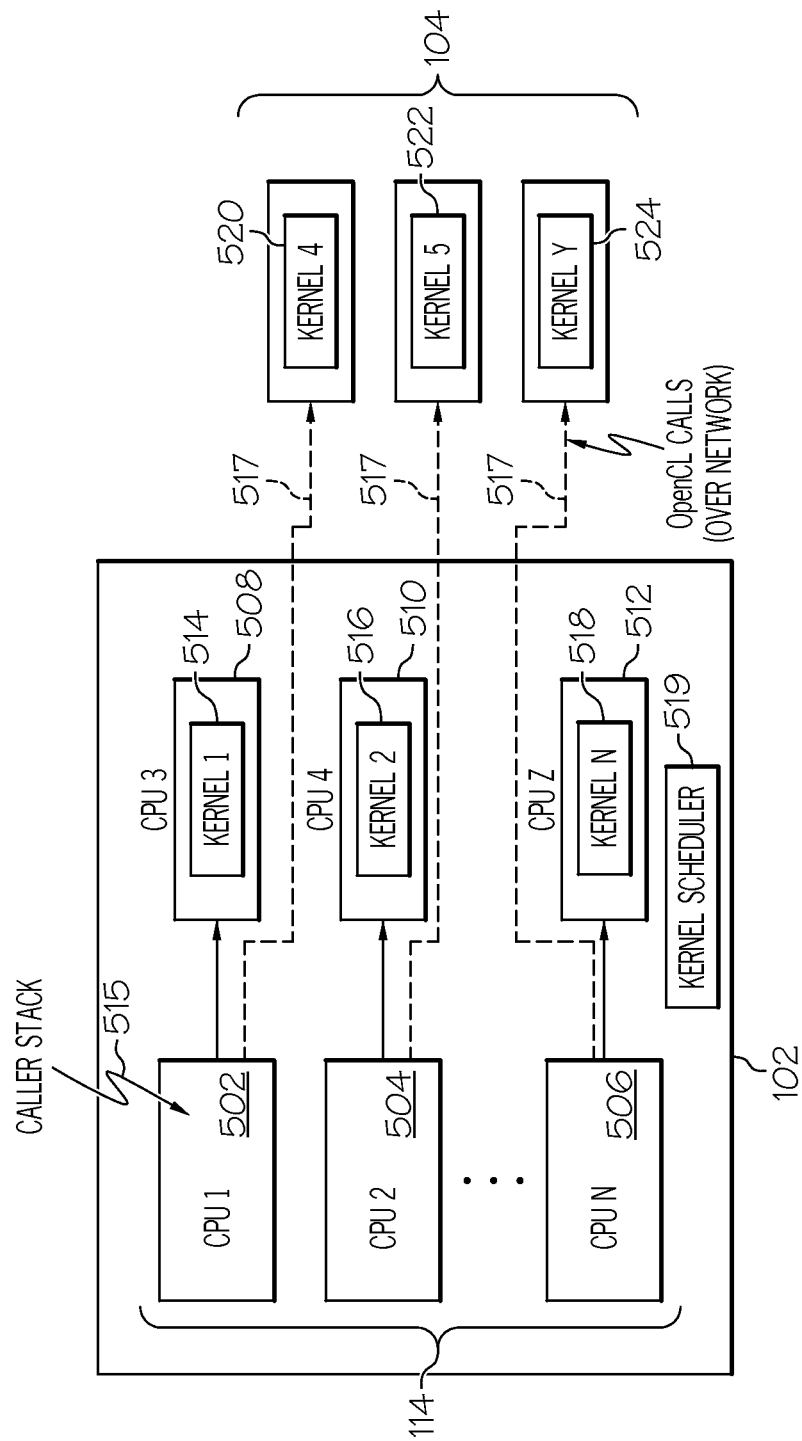
FIG. 5 is a block diagram illustrating one configuration of a server in a hybrid system for high-throughput computing according to one embodiment of the present invention.

FIG. 5 illustrates one configuration of the hybrid system 112 for redistributing allocated workloads between the server system 102 and the accelerators 104. In particular, FIG. 5 shows server system processors 502, 504, 506 that comprise cross-platform parallel programming OpenCL calling address spaces and server system processors 508, 510, 512. The server system processors 508, 510, 512 each comprise one or more compute kernels 514, 516, 518. The accelerators 104 each comprise one or more OpenCL devices such as computer kernels 520, 522, 524 and each of these devices can run one or more compute kernels. Pseudo-OpenCL devices run directly on server processors as opposed to accelerators attached using an interconnect. Pseudo-OpenCL devices may run directly on 502, 504 and 506 co-located with the calling address space. A server may instantiate Pseudo-OpenCL devices to run kernels along with kernels running on accelerator devices. This allows higher throughput to be achieved. A server may decide on a mix of pseudo OpenCL devices and accelerator OpenCL devices based on performance and energy SLA attributes. If a server is more energy efficient than accelerators, then the workload manager may instantiate more pseudo-OpenCL devices on the server to meet energy goals. A stringent performance SLA can require execution of kernels directly on the accelerators without any usage of pseudo-OpenCL kernels. A workload manager may also choose to launch OpenCL kernels on pseudo OpenCL devices only if "headroom" (in terms of MIPS or FLOPS) is available.

The pseudo-devices 508, 510, 512 execute alongside the cross-platform parallel programming caller stack 515 and present themselves to the caller stack 514 as normal devices, but execute on the server system 102. The caller stack 515 maintains a queue 136, 138 for each device 514, 516, 518, 520, 522, 524. The caller stack 515 can redistribute input data among pseudo-devices 508, 510, 512 and regular devices 502, 504, 506 based on input from workload management triggers (e.g., performance metrics, energy metrics, and the like) as discussed above. For example, OpenCL calls 517 made to the accelerators 104 for performing a workload can be satisfied by the pseudo cross-platform parallel programming devices 514, 516, 518 at the server system 102. Similarly, if heterogeneous tasks are executing across pseudo-devices 514, 516, 518 and accelerator cross-platform parallel programming devices 520, 522, 524, tasks and data items may be redistributed based on workload management triggers, as discussed above. A kernel scheduler 519 schedules a physical accelerator compute resource (processors 502, 504, 506) or pseudo-accelerator compute resource (e.g. processors/kernels 508/514, 510/516, 512/518) at the server system 102 or accelerator to satisfy the kernel call In addition, the configuration of the hybrid system 112 allows for easier and more efficient testing and debugging of the hybrid system. For example, because the hybrid system 112 comprises cross-platform parallel programming OpenCL devices (i.e. compute kernels) that are local (i.e., on the server system 102) as well as remote (i.e., on the accelerators 104). Testing of this system can be cumbersome due to the networking elements 108 involved. However, the configuration shown in FIG. 5 overcomes these problems. The remote accelerator OpenCL devices are run directly on the server as pseudo-OpenCL devices. This might lead to poorer performance, but all the OpenCL devices can be run in a unified shared memory image of the server. Networking transactions to remote accelerators execute as shared memory operations in the unified shared memory structure of the server. Testing and debugging is made simpler and more efficient by removing the networking aspects and running everything locally within the server system 102.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operational Flow Diagrams

Referring now to FIGS. 6-12, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
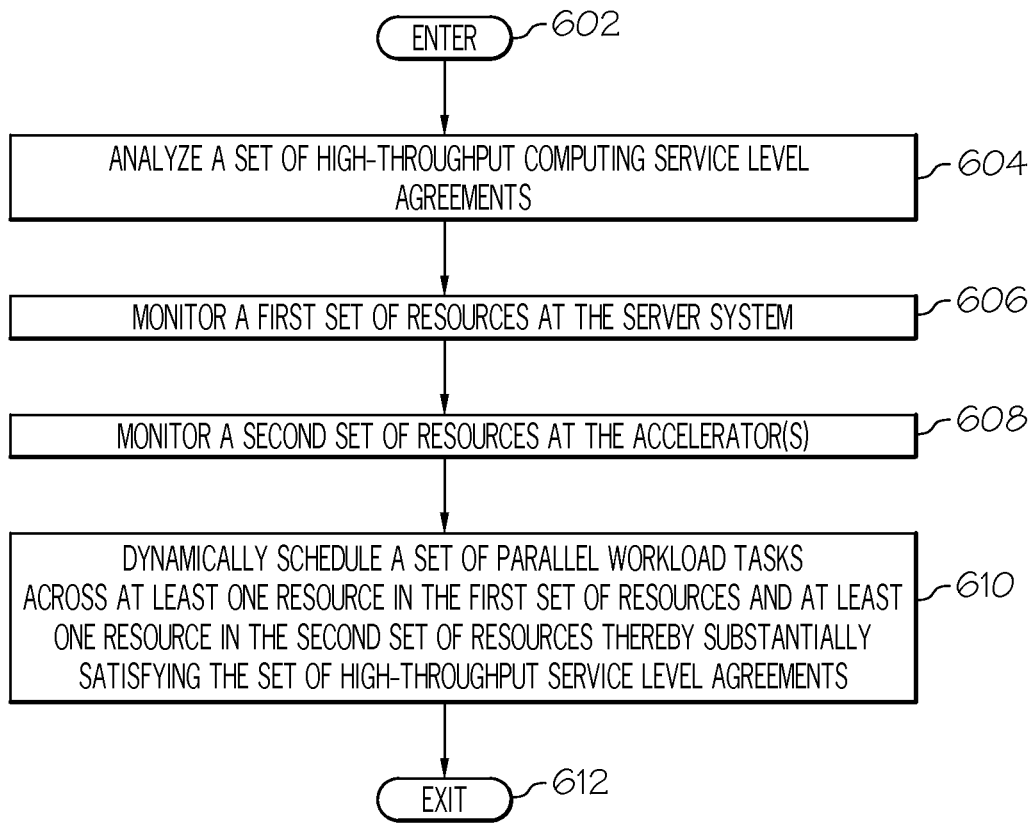
FIG. 6 is an operational flow diagram illustrating one example of providing high-throughput computing in a hybrid system according to one embodiment of the present invention.

FIG. 6 is an operational flow diagram illustrating one example of providing high-throughput computing in a hybrid computing environment, as discussed above. The operational flow of FIG. 6 begins at step 602 and flows directly into step 604. The workload manager 118, at step 604, analyzes a set of high-throughput computing SLAs 120 associated with a hybrid system 112. The workload manager 118, at step 606, monitors a first set of resources such as, but not limited to, compute kernels. The workload manager 118, at step 606, monitors a second set of resources such as, but not limited to, compute kernels. The workload manager 118, at step 610, dynamically schedules, based on the monitoring, a set of parallel workload tasks across at least one resource in the first set of resources and at least one resource in the second set of resources, thereby, substantially satisfying the set of high-throughput SLAs 120. The control flow then exits at step 612.

Figure 7:
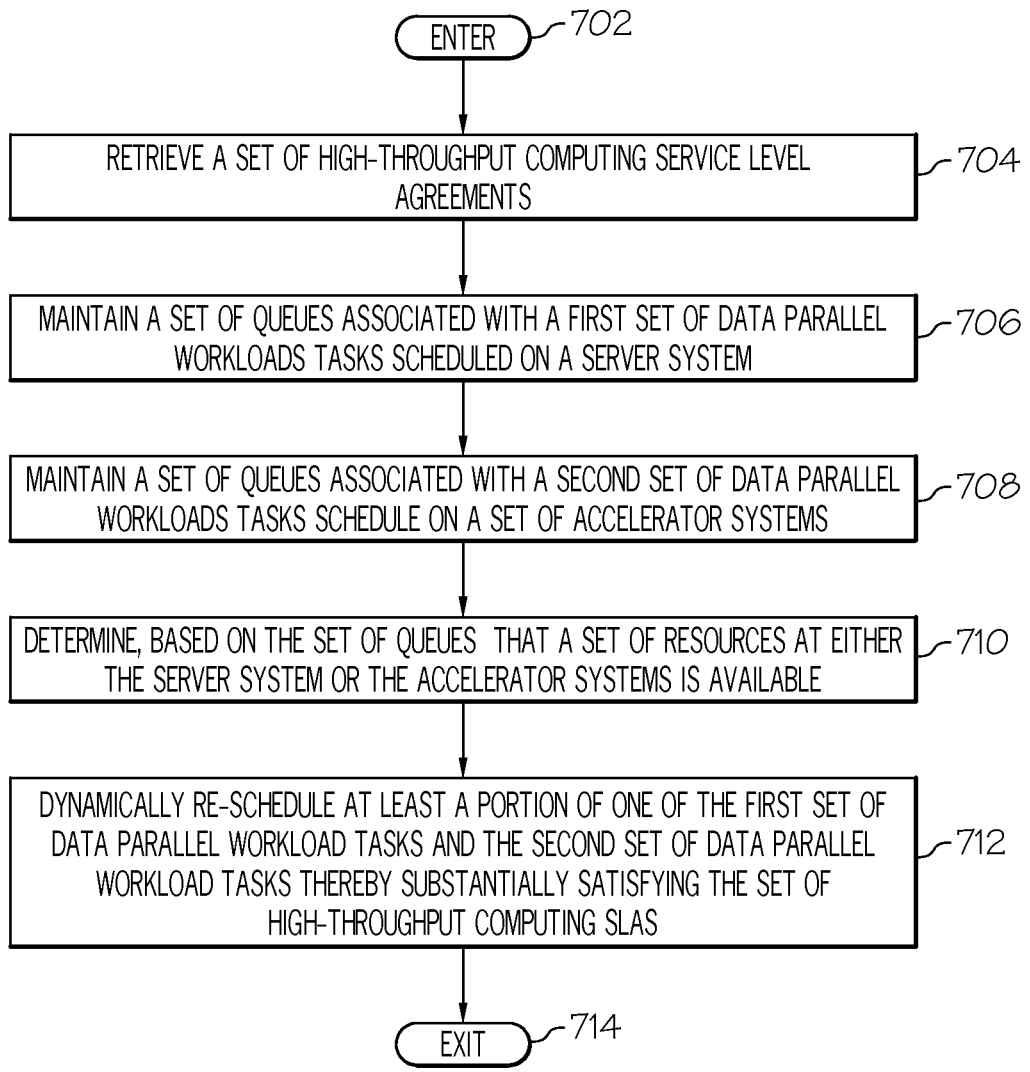
FIG. 7 is an operational flow diagram illustrating another example of providing high-throughput computing in a hybrid system according to a data access configuration of one embodiment of the present invention.

FIG. 7 is an operational flow diagram illustrating another example of providing high-throughput computing in a hybrid computing environment, as discussed above. The operational flow of FIG. 7 begins at step 702 and flows directly into step 704. The workload manager 118, at step 704, retrieves a set of high-throughput computing SLAs 120 associated with a hybrid system 112. The workload manager 118, at step 706, maintains a first set of queues 136 associated with a first set of data-parallel workload tasks scheduled on a server system 102. The workload manager 118, at step 708, maintains a second set of queues 138 associated with a second set of data-parallel workload tasks scheduled on a set of accelerator systems 104. The workload manager 118, at step 710, determines that a set of resources at either the server system 102 or the set of accelerator systems 104 is available. The workload manager 118, at step 712, dynamically reschedules, in response to the determining, at least a portion of one of the first set of data-parallel workload tasks and the second set of data-parallel workload tasks, thereby, substantially satisfying the set of high-throughput computing SLAs 120. It should be noted that the workload can be stolen, as discussed above, as compared to being dynamically rescheduled. The control flow then exits at step 714.

Figure 8:
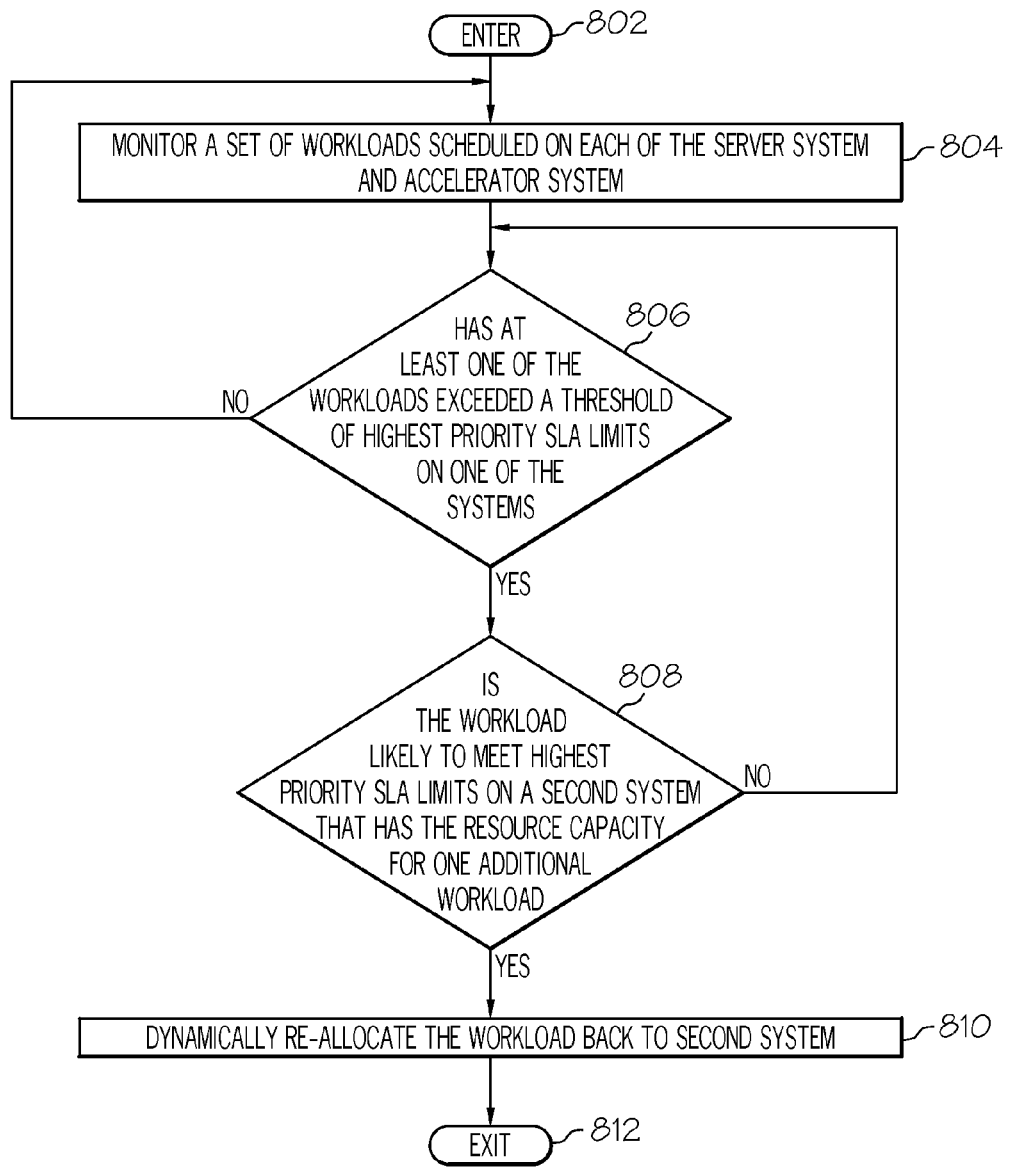
FIG. 8 is an operational flow diagram illustrating one example of providing high-throughput computing in a hybrid system by redistributing workloads according to another data access configuration according to one embodiment of the present invention.

FIG. 8 is an operational flow diagram illustrating one example of providing high-throughput computing in a hybrid computing environment by redistributing workloads, as discussed above. The operational flow of FIG. 8 begins at step 802 and flows directly into step 804. The workload manager 118, at step 804, monitors a set of workloads scheduled on each of a server system 102 and an accelerator system 104. The workload manager 118, at step 806, determines if at least one of the workloads has exceeded a threshold of highest priority SLA limits on one of the systems 102, 104. It should be noted that for a workload with throughput SLA, Energy SLA and batch-window SLA, prioritization is possible. Highest priority SLA limits refers to the SLA with highest priority of the aforementioned three SLA types. If the result of this determination is negative, the control flow returns to step 804. If the result of this determination is positive, the workload manager 118, at step 808, determines if the workload is likely to meet highest SLA priority limits on a second system that has the resource capacity for one additional workload. If the result of this determination is negative, the control flow returns to step 806. If the result of this determination is positive, the workload manager 118, at step 810, dynamically reallocates the at least one workload to the second system 102, 104. The control flow then exits at step 812.

Figure 9:
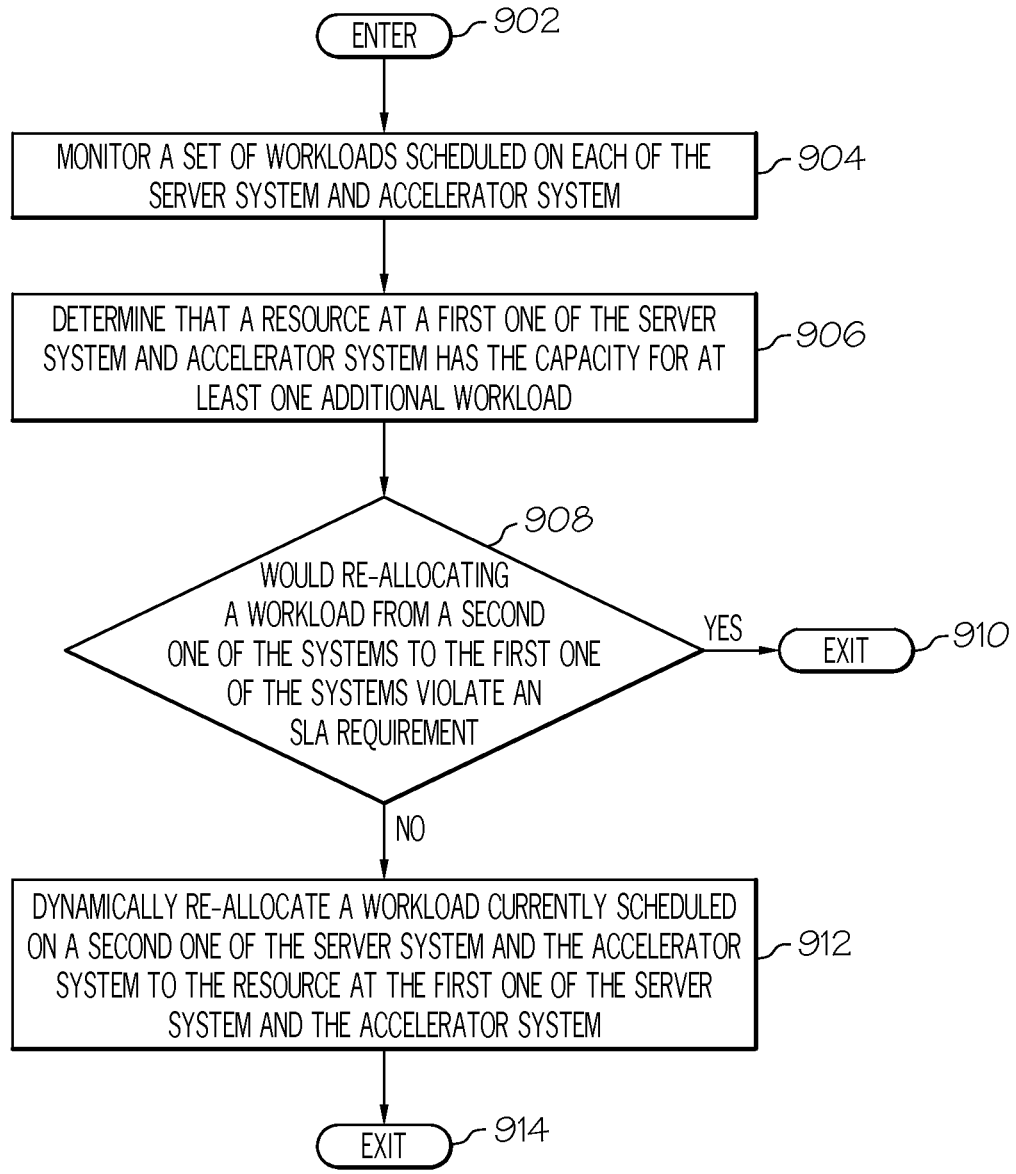
FIG. 9 is an operational flow diagram illustrating one example of providing high-throughput computing in a hybrid system by redistributing workloads based on SLAs according to another data access configuration according to one embodiment of the present invention.

FIG. 9 is an operational flow diagram illustrating one example of providing high-throughput computing in a hybrid computing environment by redistributing workloads based on SLAs, as discussed above. The operational flow of FIG. 9 begins at step 902 and flows directly into step 904. The workload manager 118, at step 904, monitors a set of workloads scheduled on each of the server system 102 and the accelerator system 104. The workload manager 118, at step 906, determines that a resource at a first one of the systems 102, 104 has the capacity for at least one additional workload. The workload manager 118, at step 908, determines if reallocating one additional workload from a second one of the systems 102, 104 would violate an SLA requirement. If the result of this determination is positive, the control flow exits at step 910. If the result of this determination is positive, the workload manager 118, at step 912, dynamically reallocates a workload currently scheduled on a second one of the systems 102, 104 to the resource at the first one of the systems 102, 104. The control flow then exits at step 914.

Figure 10:
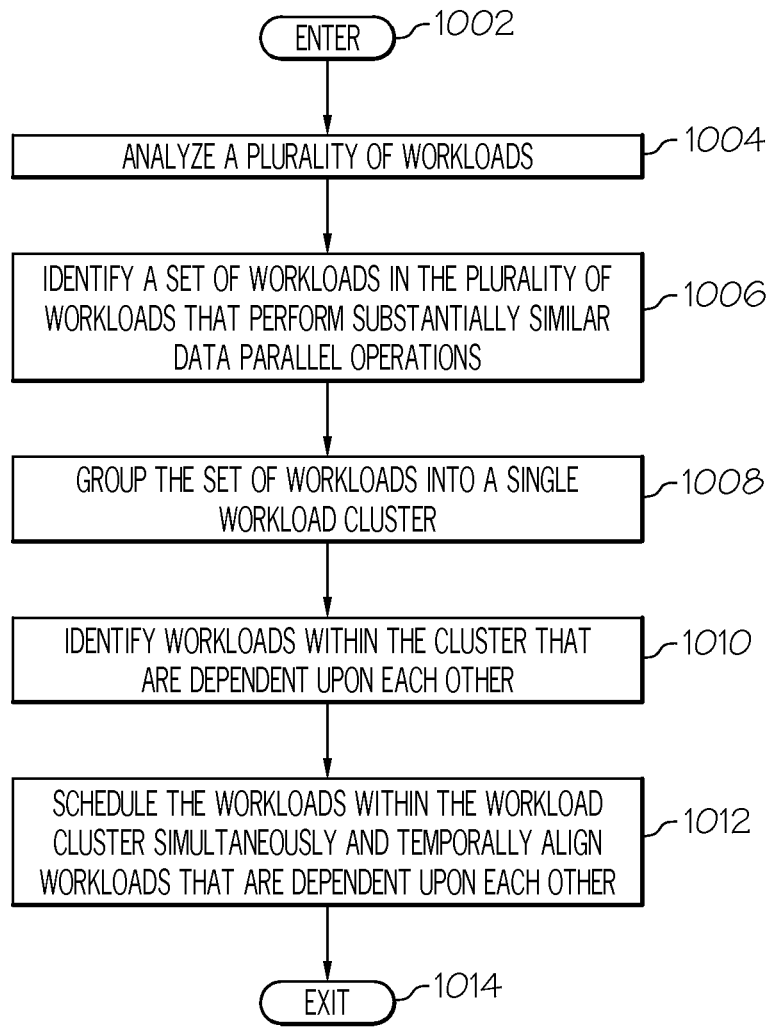
FIG. 10 is an operational flow diagram illustrating one example of clustering workloads in a hybrid system according to one embodiment of the present invention.

FIG. 10 is an operational flow diagram illustrating one example of clustering workloads in a hybrid computing environment, as discussed above. The operational flow of FIG. 10 begins at step 1002 and flows directly into step 1004. The workload manager 118, at step 1004, analyzes a plurality of workloads. The workload manager 118, at step 1006, identifies a set of workloads in the plurality of workloads that perform substantially similar data-parallel operations. The workload manager 118, at step 1008, groups the set of workloads into a single workload cluster. The workload manager 118, at step 1010, identifies workloads within the cluster that are dependent upon each other. The workload manager 118, at step 1012, schedules the workloads within the cluster simultaneously and temporally aligns workloads that are dependent upon each other. The control flow then exits at step 1014.

Figure 11:
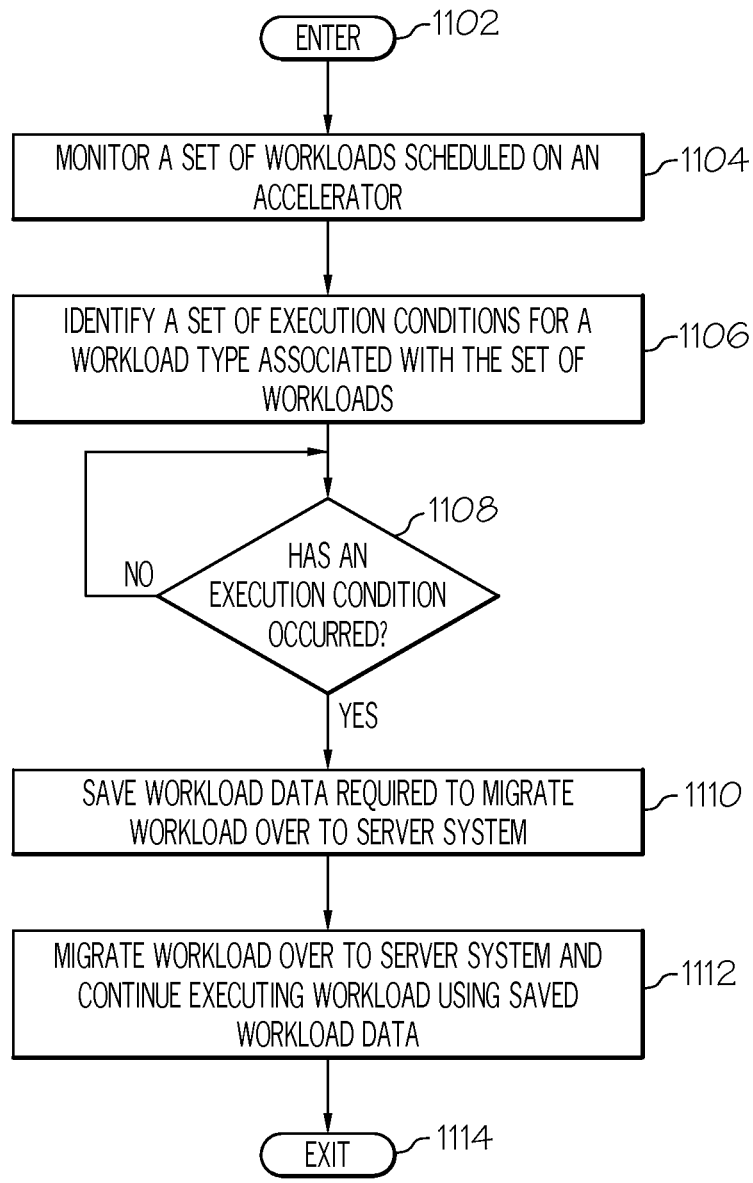
FIG. 11 is an operational flow diagram illustrating one example of migrating workloads in a hybrid system according to one embodiment of the present invention.

FIG. 11 is an operational flow diagram illustrating one example of migrating workloads in a hybrid computing environment, as discussed above. The operational flow of FIG. 11 begins at step 1102 and flows directly into step 1104. The workload manager 118, at step 1104, monitors a set of workloads scheduled on an accelerator 104. The workload manager 118, at step 1106, identifies a set of execution conditions for a workload type associated with the set of workloads. Alternatively, SLA requirement thresholds such as, but not limited to, performance thresholds and/or energy thresholds can be identified as well. The workload manager 118, at step 1108, determines if an execution condition has occurred (and/or a threshold has been met). If the result of this determination is negative, the workload manager continues determining if a condition or threshold has been met. If the result of this determination is positive, the workload manager 118, at step 1110, saves workload data required to migrate the workload associated with the condition and/or threshold over to the server system 102. The workload manager 118, at step 1112, then migrates the workload over to the server system 102 and continues execution the workload using the saved workload data. The control flow then exits at step 1114.

Figure 12:
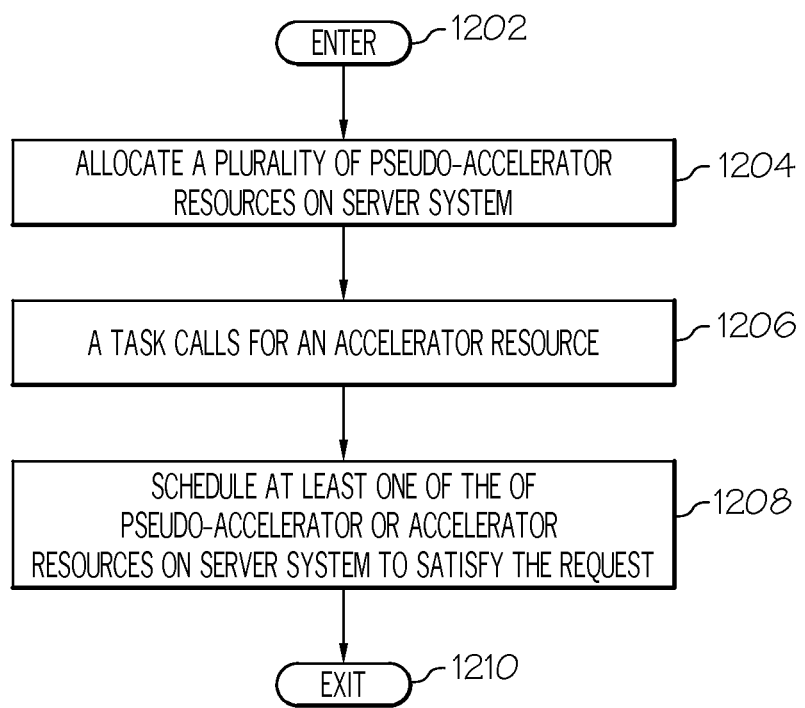
FIG. 12 is an operational flow diagram illustrating one example of configuring a server system in a system environment for performing accelerator workloads according to one embodiment of the present invention.

FIG. 12 is an operational flow diagram illustrating one example of configuring a server system in a hybrid computing environment for performing accelerator workloads, as discussed above. The operational flow of FIG. 12 begins at step 1202 and flows directly into step 1204. The workload manager 118, at step 1204, allocates a plurality of pseudo-accelerator resources 508, 510, 512 on the server system 102. The mix and ordinality of pseudo accelerator resources and physical accelerator resources is derived from throughput computing, Energy SLAs, and batch-window SLAs. A task, at step 1206, calls a compute kernel at the accelerator system 104 or pseudo accelerator system. The kernel scheduler 519, at step 1208, schedules a physical accelerator compute resource or pseudo-accelerator compute resource at the server system 102 or accelerator to satisfy the kernel call. The control flow then exits at step 1210.

Information Processing System

Figure 13:
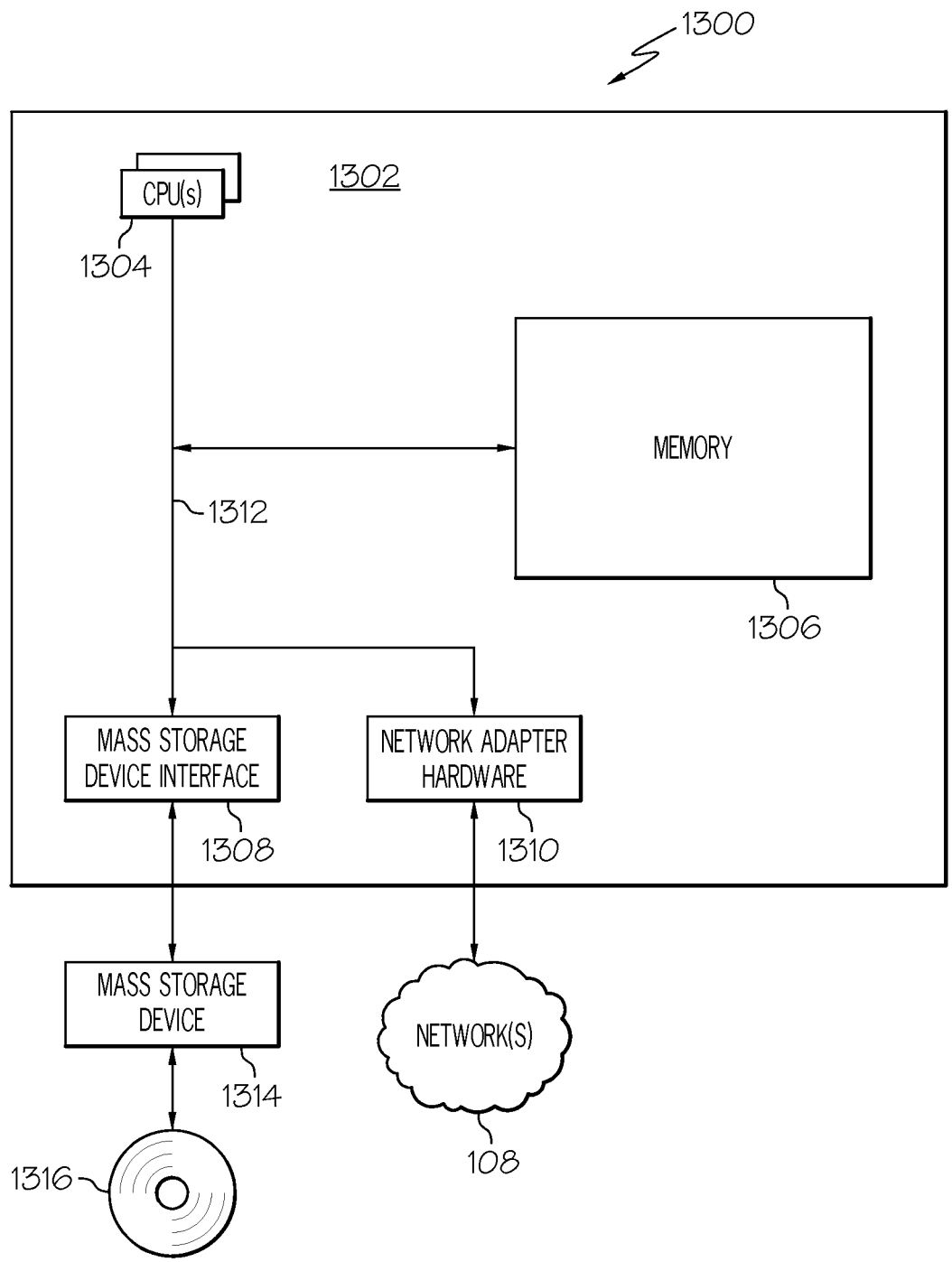
FIG. 13 is a block diagram illustrating detailed view of an information processing system according to one embodiment of the present invention.

FIG. 13 is a block diagram illustrating a more detailed view of an information processing system 1300 that can be utilized in the operating environment 100 discussed above with respect to FIG. 1. The information processing system 1300 is based upon a suitably configured processing system adapted to implement one or more embodiments of the present invention. Similarly, any suitably configured processing system can be used as the information processing system 1300 by embodiments of the present invention. It should be noted that the information processing system 1300 can either be the server system 102 or the accelerator system 104 with their respective components as shown in FIG. 1.

The information processing system 1300 includes a computer 1302. The computer 1302 has a processor(s) 1304 (such as processors 114 or 116) that is connected to a main memory 1306, mass storage interface 1308, and network adapter hardware 1310. A system bus 1312 interconnects these system components. The main memory 1306, in one embodiment, comprises either the components of the server system 102 such as the workload manager 118 (and is components), SLAs 120, and workload queue 136 or the components of accelerator 104 such as the workload queue 138 discussed above.

Although illustrated as concurrently resident in the main memory 1306, it is clear that respective components of the main memory 1306 are not required to be completely resident in the main memory 1306 at all times or even at the same time. In one embodiment, the information processing system 1300 utilizes conventional virtual addressing mechanisms to allow programs to behave as if they have access to a large, single storage entity, referred to herein as a computer system memory, instead of access to multiple, smaller storage entities such as the main memory 1306 and data storage device 1316. Note that the term "computer system memory" is used herein to generically refer to the entire virtual memory of the information processing system 1300.

The mass storage interface 1308 is used to connect mass storage devices, such as mass storage device 1314, to the information processing system 1300. One specific type of data storage device is an optical drive such as a CD/DVD drive, which may be used to store data to and read data from a computer readable medium or storage product such as (but not limited to) a CD/DVD 1316. Another type of data storage device is a data storage device configured to support, for example, NTFS type file system operations.

Although only one CPU 1304 is illustrated for computer 1302, computer systems with multiple CPUs can be used equally effectively. Embodiments of the present invention further incorporate interfaces that each includes separate, fully programmed microprocessors that are used to off-load processing from the CPU 1304. An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1300. The network adapter hardware 1310 is used to provide an interface to a network 108. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 1316, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A method, with an information processing system, for managing workloads in a high throughput computing environment for a hybrid processing system, the method comprising:

retrieving a set of high-throughput computing service level agreements (SLAs), the set of high-throughput computing SLAs being associated with a hybrid processing system comprising at least one server system comprising one or more processors of a first architecture and a set of accelerator systems each comprising a different type of one or more processors of a second architecture that is different than the first architecture, wherein the set of accelerator systems is separate from the at least one server system, and wherein at least one SLA in the set of SLAs is dynamically updatable at least during execution of data parallel workload tasks associated with the at least one SLA, and wherein each SLA in the set of SLAs is a multi-dimensional SLA comprising at least one performance throughput SLA, at least one performance response time batch window SLA, and at least one energy SLA, to be satisfied by the hybrid processing system, wherein each of the performance throughput SLA, the response time batch window SLA, and the energy SLA is associated with a relative priority between each other;

identifying a first set of data parallel workload tasks scheduled on the at least one server system and a second set of data parallel workload tasks scheduled with the set of accelerator systems;

determining that a set of resources at a first one of the at least one server system and the set of accelerator systems is currently available; and dynamically re-scheduling, based on the determining, at least a portion of one of the first set of data parallel workload tasks and the second set of data-parallel workload tasks on a second one of the at least one server system and the set of accelerator systems, the dynamically rescheduling substantially satisfying the set of high-throughput computing SLAs.

2. The method of claim 1, further comprising:

maintaining a set of queues associated with the first set of data-parallel workload tasks and the second set of data-parallel workload tasks, wherein each task in the first set of data-parallel workload tasks and second set of data-parallel workload tasks is associated with an entry within the set of queues.

3. The method of claim 2, further comprising:

mapping the set of queues to a memory that is shared between the at least one server system and the set of accelerator systems.

4. The method of claim 2, wherein the dynamically rescheduling further comprises:

monitoring the set of queues;

determining, based on the monitoring, that a first queue in the set of queues comprises at least one data-parallel workload task in the first set of data-parallel workload tasks that is waiting to be executed;

determining that the set of resources is currently available at the set of accelerator systems; and rescheduling the at least one data-parallel workload task in the first set of data-parallel workload tasks on the set of accelerator systems based on determining that the set of resources is currently available at the set of accelerator systems.

5. The method of claim 2, wherein the dynamically rescheduling further comprises:
monitoring the set of queues;
determining, based on the monitoring, that a second queue in the set of queues comprises at least one data-parallel workload task in the second set of data-parallel workload tasks that is waiting to be executed; and
determining that the set of resources is currently available at the at least one server system;
rescheduling at least a portion of a set of input data associated with the at least one data-parallel workload task in the second set of data-parallel workload tasks on the at least one server system based on determining that the set of resources is currently available at the at least one server system.

6. The method of claim 1, wherein the first one of the at least one server system and the set of accelerator systems is the at least one server system, and wherein the second one of the at least one server system and the set of accelerator systems is the set of accelerator systems.

7. The method of claim 1, wherein the first one of the at least one server system and the set of accelerator systems is the set of accelerator systems, and wherein the second one of the at least one server system and the set of accelerator systems is the at least one server system.

8. The method of claim 1, wherein the first one of the at least one server system and the set of accelerator systems is the at least one server system, and wherein determining that the set of resources are currently available further comprises:
determining that the at least one server system comprises a set of available computing operations.

9. The method of claim 8, wherein the set of available computing operations are at least one of:
pre-purchased Million Instruction Per Second operations;
unused floating point operations; and
unused processor capacity resulting from an input/output blocking state.

10. The method of claim 1, wherein the dynamically rescheduling further comprises:
comparing a performance throughput requirement as indicated in the set of high-throughput computing SLAs to a current performance throughput rate associated with at least one of the first set of data-parallel workload tasks and the second set of data-parallel workload tasks; and
determining, based on the comparing, that the current performance throughput rate of the hybrid processing system is below a given threshold, wherein the dynamically rescheduling is based on determining that the current performance throughput rate of the hybrid processing system is below a given threshold and increases the current performance throughput rate to at least substantially satisfy the given threshold.

11. The method of claim 1, wherein the one of the first set of data-parallel workload tasks and the second set of data-parallel workload tasks is currently executing on the one of the at least one server system and the set of accelerator systems, the dynamically rescheduling comprising:
stopping execution one of the first set of data-parallel workload tasks and the second set of data-parallel workload tasks;
migrating, based on the stopping, the one of the first set of data-parallel workload tasks and the second set of data-parallel workload tasks to the one of the at least one server system and the set of accelerator systems; and
restarting execution of the one of the first set of data-parallel workload tasks and the second set of data-parallel workload tasks on the one of the at least one server system and the set of accelerator systems, wherein the execution is restarted at a state where the execution of the first set of data-parallel workload tasks and the second set of data-parallel workload tasks was stopped.

12. A system for managing workloads in a high-throughput computing environment for a hybrid processing system, the system comprising:
a memory;
a processor communicatively coupled to the memory; and
a workload manager communicatively coupled to the memory and the processor, the workload manager configured to perform a method comprising:
retrieving a set of high-throughput computing service level agreements (SLAs), the set of high-throughput computing SLAs being associated with a hybrid processing system comprising at least one server system comprising one or more processors of a first architecture and a set of accelerator systems each comprising a different type of one or more processors of a second architecture that is different from the first architecture, wherein the set of accelerator systems is separate from the at least one server system, and wherein at least one SLA in the set of SLAs is dynamically updatable at least during execution of data parallel workload tasks associated with the at least one SLA, and wherein each SLA in the set of SLAs is a multi-dimensional SLA comprising
at least one performance throughput SLA,
at least one performance response time batch window SLA, wherein the performance response time batch window is configured to at least one of shrink and expand during execution of data parallel workload tasks, and
at least one energy SLA identifying an workload energy consumption threshold, to be satisfied by the hybrid processing system,
wherein each of the performance throughput SLA, the response time batch window SLA, and the energy SLA is associated with a relative priority between each other;
dynamically rescheduling, based on the determining, at least a portion of one of the first set of data-parallel workload tasks and the second set of data-parallel workload tasks on a second one of the at least one server system and the set of accelerator systems, the dynamically rescheduling substantially satisfying the one of the performance throughput SLA, the response time batch window SLA, and the energy SLA comprising a highest priority in the relative priority identified to have the highest priority.

13. The system of claim 12, the method further comprising:
maintaining a set of queues associated with the first set of data-parallel workload tasks and the second set of data-parallel workload tasks, wherein each task in the first set of data-parallel workload tasks and second set of data-parallel workload tasks is associated with an entry within the set of queues; and
mapping the set of queues to a memory that is shared between the at least one server system and the set of accelerator systems.

14. The system of claim 13, wherein the dynamically rescheduling further comprises:
monitoring the a set of queues;
determining, based on the monitoring, that a first queue in the set of queues comprises at least one data-parallel workload task in the first set of data-parallel workload tasks that is waiting to be executed;

determining that the set of resources is currently available at the set of accelerator systems; and rescheduling at least a portion of a set of input data associated with the at least one data-parallel workload tasks in the first set of data-parallel workload tasks on the set of accelerator systems based on determining that the set of resources is currently available at the set of accelerator systems.

15. The system of claim 13, wherein the dynamically rescheduling further comprises:

monitoring the set of queues;

determining, based on the monitoring, that a second queue in the set of queues comprises at least one data-parallel workload task in the second set of data-parallel workload tasks that is waiting to be executed;

determining that the set of resources is currently available at the at least one server system; and rescheduling the at least one data-parallel workload task in the second set of data-parallel workload tasks on the at least one server system based on determining that the set of resources is currently available at the at least one server system.

16. The system of claim 12, wherein the first one of the at least one server system and the set of accelerator systems is the at least one server system, and wherein determining that the set of resources is currently available further comprises:

determining that the at least one server system comprises a set of available computing operations.

17. The system of claim 12, wherein the dynamically rescheduling further comprises:

comparing a performance throughput requirement as indicated in the set of high-throughput computing SLAs to a current performance throughput rate associated with at least one of the first set of data-parallel workload tasks and the second set of data-parallel workload tasks; and determining, based on the comparing, that the current performance throughput rate of the hybrid processing system is below a given threshold, wherein the dynamically rescheduling is based on determining that the current performance throughput rate of the hybrid processing system is below a given threshold and increases the current performance throughput rate to at least substantially satisfy the given threshold.

18. A computer program product for managing workloads in a high-throughput computing environment for a hybrid processing system, the computer program product comprising:

a non-transitory storage medium readable by a processing circuit and storing instructions for execution by the processing circuit for performing a method comprising:

retrieving a set of high-throughput computing service level agreements (SLAs), the set of high-throughput computing SLAs being associated with a hybrid processing system comprising at least one server system comprising one or more processors of a first architecture and a set of accelerator systems each comprising a different type of one or more processors of a second architecture that is different from the first architecture, wherein the set of accelerator systems is separate from the at least one server system, and wherein at least one SLA in the set of SLAs is dynamically updatable at least during execution of data parallel workload tasks associated with the at least one SLA, and wherein each SLA in the set of SLAs is a multi-dimensional SLA comprising at least one performance throughput SLA, at least one performance response time batch window SLA, and at least one energy SLA, to be satisfied by the hybrid processing system, wherein each of the performance throughput SLA, the response time batch window SLA, and the energy SLA is associated with a relative priority between each other;

identifying a first set of data-parallel workload tasks scheduled on the at least one server system and a second set of data-parallel workload tasks scheduled with the set of accelerator systems;

determining that a set of resources at a first one of the at least one server system and the set of accelerator systems are currently available; and dynamically rescheduling, based on the determining, at least a portion of one of the first set of data-parallel workload tasks and the second set of data-parallel workload tasks on a second one of the at least one server system and the set of accelerator systems, the dynamically rescheduling substantially satisfying the set of high-throughput computing SLAs.

19. The computer program product of claim 18, further comprising:

maintaining a set of queues associated with the first set of data-parallel workload tasks and the second set of data-parallel workload tasks, wherein each task in the first set of data-parallel workload tasks and second set of data-parallel workload tasks is associated with an entry within the set of queues; and mapping the set of queues to a memory that is shared between the at least one server system and the set of accelerator systems.

20. The computer program product of claim 19, wherein the dynamically rescheduling further comprises:

monitoring the set of queues;

determining, based on the monitoring, that a first queue in the set of queues comprises at least one data-parallel workload task in the first set of data-parallel workload tasks that is waiting to be executed;

determining the set of resources is currently available at the set of accelerator systems; and rescheduling the at least one data-parallel workload task in the first set of data-parallel workload tasks on the set of accelerator systems based on determining that the set of resources is currently available at the set of accelerator systems.

21. The computer program product of claim 19, wherein the dynamically rescheduling further comprises:

monitoring the set of queues;

determining, based on the monitoring, that a second queue in the set of queues comprises at least one data-parallel workload task in the second set of data-parallel workload tasks that is waiting to be executed;

determining the set of resources is currently available at the at least one server system; and rescheduling the at least one data-parallel workload task in the second set of data-parallel workload tasks on the at least one server system based on determining that the set of resources is currently available at the at least one server system.

22. The computer program product of claim 18, wherein the first one of the at least one server system and the set of accelerator systems is the at least one server system, and wherein the second one of the at least one server system and the set of accelerator systems is the set of accelerator systems.

23. The computer program product of claim 18, wherein the first one of the at least one server system and the set of accelerator systems is the set of accelerator systems, and wherein the second one of the at least one server system and the set of accelerator systems is the at least one server system.

24. The computer program product of claim 18, wherein the first one of the at least one server system and the set of accelerator systems is the at least one server system, and wherein determining that the set of resources is currently available further comprises:
   determining that the at least one server system comprises a set of available computing operations.

25. The computer program product of claim 19, wherein the dynamically rescheduling further comprises:
   comparing a performance throughput requirement as indicated in the set of high-throughput computing SLAs to a current performance throughput rate associated with at least one of the first set of data-parallel workload tasks and the second set of data-parallel workload tasks; and
   determining, based on the comparing, that the current performance throughput rate of the hybrid processing system is below a given threshold, wherein the dynamically rescheduling is based on determining that the current performance throughput rate of the hybrid processing system is below a given threshold and increases the current performance throughput rate to at least substantially satisfy the given threshold.

* * * * *